(12) United States Patent
Thordarson

(10) Patent No.: US 8,423,696 B2
(45) Date of Patent: Apr. 16, 2013

(54) MULTIMEDIA DOCKING COMPUTER

(75) Inventor: Johannes Thordarson, Reykjavik (IS)

(73) Assignee: I-Do Invest Limited, West Sheug Wan (HK)

( * ) Notice: Subject to any disclaimer, the term of this patent is extended or adjusted under 35 U.S.C. 154(b) by 759 days.

(21) Appl. No.: 12/520,781

(22) PCT Filed: Dec. 21, 2007

(86) PCT No.: PCT/IS2007/000026
§ 371 (c)(1),
(2), (4) Date: Dec. 16, 2009

(87) PCT Pub. No.: WO2008/075382
PCT Pub. Date: Jun. 26, 2008

(65) Prior Publication Data
US 2010/0095042 A1    Apr. 15, 2010

(30) Foreign Application Priority Data

Dec. 21, 2006  (IS) ............................................... 8585
Oct. 10, 2007  (IS) ............................................... 8681

(51) Int. Cl.
*H05K 7/10*          (2006.01)

(52) U.S. Cl.
USPC ........................................... 710/301; 434/308

(58) Field of Classification Search .......... 710/301–302; 434/308
See application file for complete search history.

(56) References Cited

U.S. PATENT DOCUMENTS

| | | | |
|---|---|---|---|
| 5,387,042 A * | 2/1995 | Brown | 400/477 |
| 7,487,226 B2 * | 2/2009 | Blair et al. | 709/219 |
| 2003/0059757 A1 | 3/2003 | Wood | |
| 2008/0077722 A1 * | 3/2008 | Tang et al. | 710/260 |
| 2009/0100207 A1 * | 4/2009 | Jones et al. | 710/301 |

* cited by examiner

*Primary Examiner* — Clifford Knoll
(74) *Attorney, Agent, or Firm* — Muncy, Geissler, Olds & Lowe, PLLC

(57) ABSTRACT

The present invention relates to multimedia devices for different age groups with different ability to understand and control such multimedia devices. The invention relates more specifically to a computer device for multimedia functions, where the functions are provided in a control unit/peripheral device for the computer device. The control unit comprises all the essential functional parts and operational codes for its function and can operate alone through the display device or in combination with other peripheral devices.

18 Claims, 4 Drawing Sheets

MULTIMEDIA DOCKING COMPUTER

FIELD OF THE INVENTION

Figure 1:
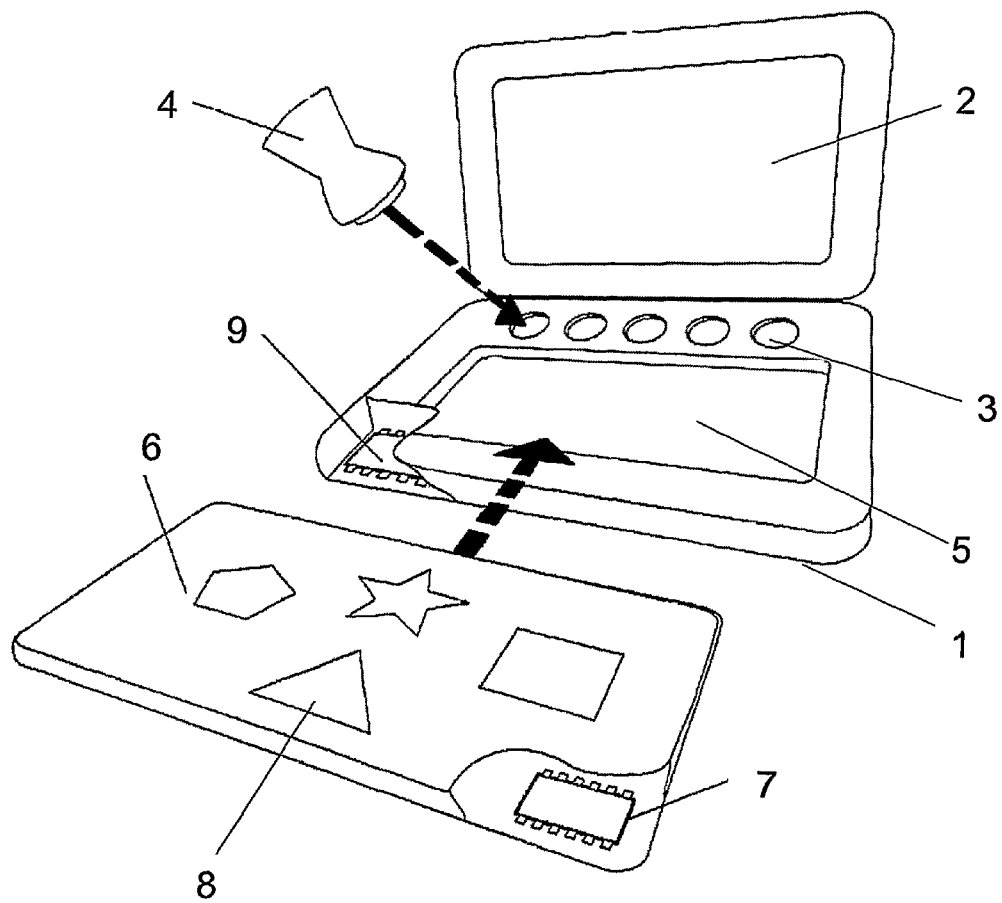

The present invention relates to multimedia devices for different age groups with different ability to understand and control such multimedia devices.

BACKGROUND OF INVENTION

Development of interactive devices for kids for entertaining and educational purposes is fast and new devices are being launched every day. These devices have various multimedia functions such as allowing access to the internet Devices such as computers, gaming consoles, telecommunication devices, such as phones and other handheld devices are more popular than ever and each new device has at least one multimedia and or telecommunication. the complexity of the devices also increases steadily and the devices available become more and more complex and more multifunctional. This evolutions also results in rapid update of the devices indicated above and renewal time for these instruments is from 18 months for the less costly instruments to 3-4 years for multimedia computers.

Development of multimedia devices for minors and disabled is also increasing and availability of computers specially designed for children and disabled are now available. This development is stimulated by the education industry as well as the gaming industry and has resulted in development of controllers for this group of individuals to operate more complex multimedia devices.

SUMMARY OF INVENTION

The present invention relates to a simple computer device, which is advantageous for disabled and children. display device for multimedia functions, where the functions are provided in a control unit/peripheral device for the display device. The control unit comprises all the essential functional parts and operational codes for its function and can operate alone through the display device or in combination with other peripheral devices. This invention is a plug and a socket invention, where the socket device is a housing comprising a screen and connections for plugs having functional features. The socket is a displaying device, which is not functional when one or more displaying controllers (plugs) is plugged into the displaying device. The displaying controllers are characterised by comprising the functional components and program codes for the controller to, optionally memory and ID register.

In a first aspect of the present invention a display device for performing multimedia functions is provided. The display device comprises housing; motherboard; a screen; a video controller; one or more sockets; and a docking portion. The docking portion receives a control device further comprising the operational software and human-machine-interface for operation of the display device and the multimedia functions.

In a second aspect of the present invention a multimedia display system is provided for performing multimedia operation. The system comprises a display device comprising a housing; a screen; motherboard; a video controller; one or more sockets, and a docking portion. The system further comprises a control board to be inserted into the docking portion and activating members to be inserted into the one or more sockets. The control board further comprises the operational software for the device and the human-machine-interface for performing the multimedia function and the activation members activate functions of the display device or connect the display device to peripheral devices.

In a third aspect of the present invention a multimedia docking system is provided for receiving multimedia peripheral devices through a display device. The display device comprises; a housing, motherboard, a screen a video controller, and one or more connectors for receiving peripheral devices. The peripheral device comprises a housing, a processing means, a memory, a code, ID register, a control-interface, a software, and a plug.

The peripheral device for the multimedia docking system can be embedded in the frame of the display device so that the human-machine-interface is accessible to the user like a keyboard in a lap-top computer. The display device further can also comprise enabling connectors for receiving enablers for enabling functions like printing, accessing internet, scanning, listening to music etc.

DESCRIPTION OF INVENTION

All embodiments disclosed herein apply to the devices and systems of the present invention.

In an embodiment of the present invention the sockets of the display device receive activation members for activating functions of the display device or a memory device with multimedia content to by played by the display device. The sockets may also receive a memory device to copy data from the display device to transport to other multimedia devices or activation members for activating internet access as well as activation members for activating accessory devices.

In an embodiment of the present invention the display device further comprises a secondary storage means, disc drive or speakers.

In another embodiment each socket enables a predetermined portion of the screen. Then the user will be able to select which module he would like to monitor at each time. This means that a TV-program being monitored could be in socket D, so the picture would be bad, but the user would still be able to hear the sound (such as to follow a sporting event).

Two or more modules can also recognize each other through the display docking device. When a recording means, such as a camera device (including control software) is plugged in, the software will send incoming signals through the display device to a storage means (also plugged into the display device). If storage means (memory device) is not plugged into to the display device, no content is stored, but only kept in short term memory of the display device.

In an embodiment of the present invention a displaying apparatus for receiving displaying controllers or peripheral devices is provided where the displaying apparatus comprises a housing; a motherboard; a screen; a video controller, and one or more connectors for receiving displaying controllers. Operational displaying controllers for operating with the displaying apparatus comprise a housing, a cpu means, a memory, a code (written in hardware or software), ID register, a control-interface, a software, and a plug. The displaying controller provides the operational software and control-interface for the combined function of the displaying apparatus and the displaying controller.

The plug can be any kind of a multimedia plug, such as USB, blue tooth, or a specially designed pin plug. The essential feature of the plug is that it must be able to communicate data signals, audio signals and video signals. The modules can also be attached to the display device via cables, or via a hub, attached to the display device?

In a specific embodiment of the present invention, further outlined in the example below, a computer apparatus is presented, designed to be simple in order for young children or disabled person to operate. For each function, a game or an access to an internet site, a new control board in placed on the receiving portion for receiving a control board. The specific control board has the software to be used for the game/internet site, specific control buttons for the game or for browsing the site and optionally a memory device.

If the user want's to print from the computer, the user needs to place the appropriate operation key into the operation cubes receiving portion, and then access to the printer is granted. The operation key can also contain a memory device, such that when the key is placed in the correct socket, a screen copy is taken and stored in the key. The key is then removed from the socket and placed in a printer specially designed for the computer of the present invention. The screen shot will then be transported to the printer and printed onto paper.

A new control board is provided for each application/game/internet access to be accessed by the user. The operation keys also activate peripheral devices of the computer when placed in the appropriate operation cubes receiving portion. Each operation key might give access to a peripheral device such as a printer, scanner, internet access etc. The computer apparatus can also contain a secondary storage means and/or a disk drive. The control board can be designed such that it directs the user to a specific internet address and allows only browsing through that site.

In an embodiment of the present invention the operation keys can contain a memory device for storing content such as music, movie, show or other media to be played or visualised on the display device or the computer.

In an embodiment of the present invention the operation keys enable normal computer functions such as activating a mouse by wire or wireless, touch pad, connection to a scanner, web camera, speakers etc.

The display device can also include secondary storage device such as a hard drive. Such secondary storage device can store settings in a game or score. The apparatus can also include disk drive.

When the computer apparatus is used for is us for Internet browsing, the control board directs the user to and provides access to a specific Internet site. The control board for this function has control buttons to browse the site. Any means for moving a cursor over the screen can be used.

DETAILED DESCRIPTION OF THE PRESENT INVENTION

The invention will now be described with drawings and examples and two different embodiments of the present invention will now be described with reference numbers indicating specific features in the drawings.

FIG. 1 is a schematic drawing of a specific embodiment of the present invention, a multimedia device specifically designed for kids or disabled persons. In this embodiment, the multimedia device is a personal computer in the form of a lap top computer comprising a body 1 further comprising a display 2, sockets 3 for operation keys 4 and a docking portion 5 for receiving a control board 6. Operation keys 4 are placed into the sockets 3 for enabling specific functions or peripheral devices or internet access. The control board 6 is placed into the docking portion 5 to start a game or a program or to activate an internet site. In this specific embodiment the control board 6 comprises a operational software or program 7 and operational buttons 8 for operation the software 7 for the game, program or internet site. The operational software in the control board 6 operates as it connects with the motherboard 9 of the computer and thereby is connected to all operations components of the computer, such as memory, cpu, display and sockets enabling peripheral functions such as Internet access, printing etc.

Figure 2:
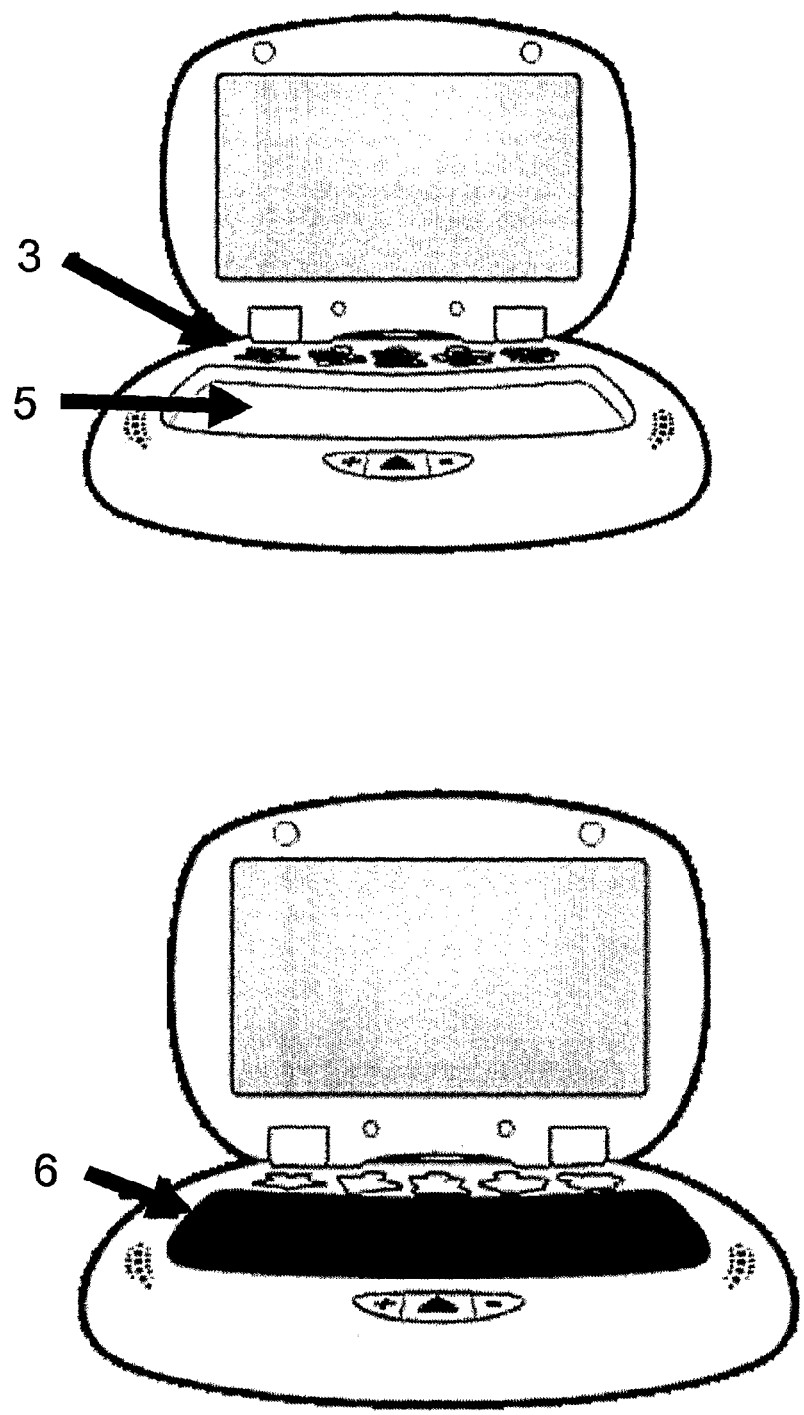

FIG. 2 shows a similar device as shown in FIG. 1. The sockets 3 behind the docking portion 5 have different shape, such that only the correct key 4 can be inserted into the appropriate socket 3 to enable the desired function. This means that a key 4 for taking a screen shot from the display to be transported to the printer will only fit onto the socket 3 designated for the printing operation etc. The device also has three buttons in front of the docking portion. Two volume buttons 10, 11 to raise and lower the volume and an eject button 12 between the two volume buttons 10, 11 to eject the control board 6 from the docking portion 5.

Figure 3:
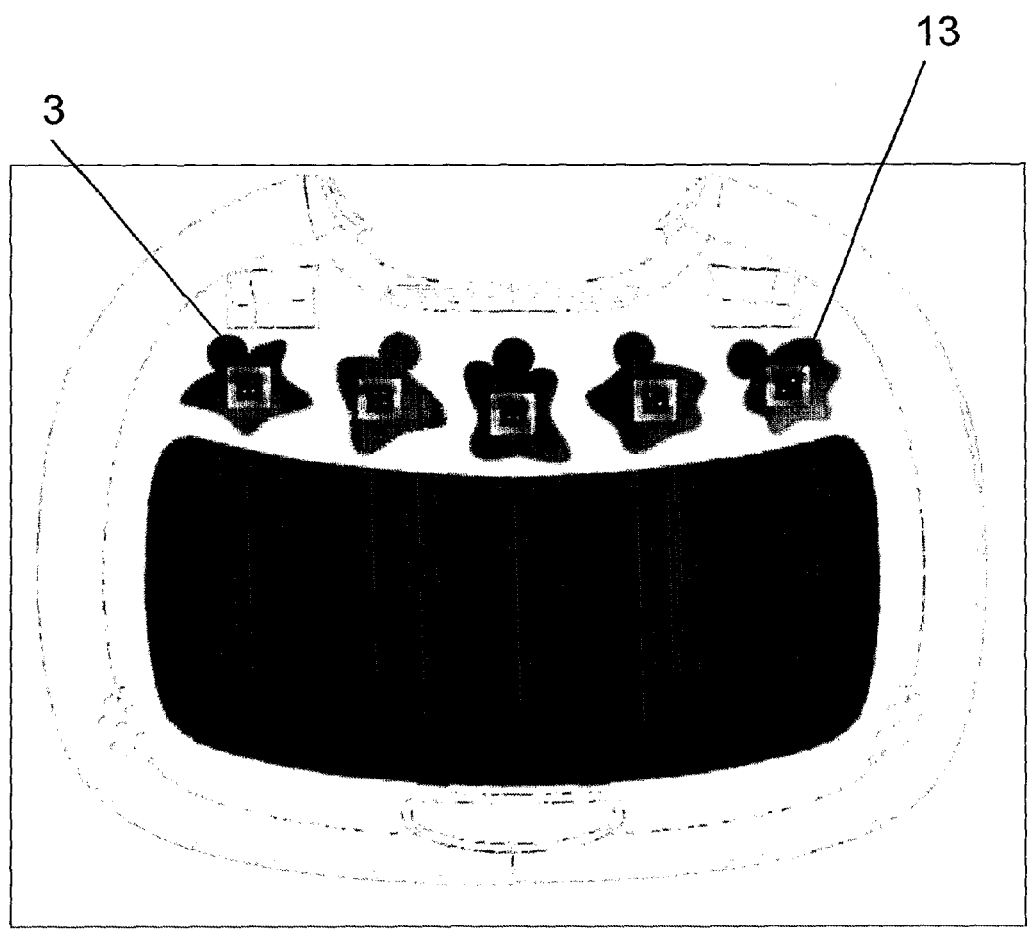

FIG. 3 discloses the structure and the function of the sockets in the embodiment disclosed above and in Example 1. In this embodiment the device has five sockets, all with a different shape, such that only the correct key can be inserted into the appropriate socket 3. in the bottom of each socket is a square lower socket 13 for connecting the functional component of the key to the motherboard of the computer. The functional component can be a memory device or an activating means for activating the function enabled by the socket, such as a mouse, internet, web camera etc.

Figure 4:
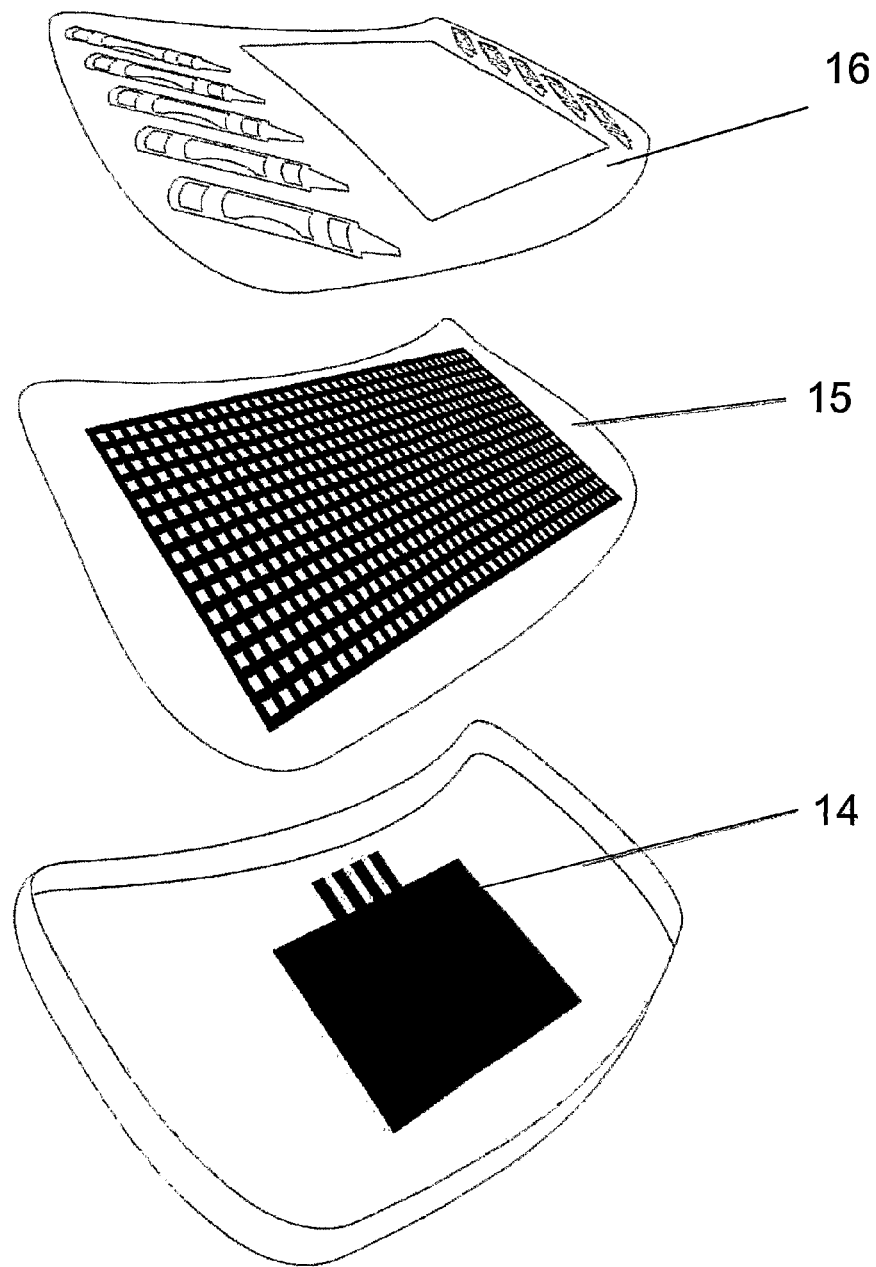

FIG. 4 shows the relationship of the docking portion 5 with the control board 6 and the assembly of the control board it self. The docking portion 5 comprises a connecting portion 14 for connecting the control board 6 and it's components (software and control buttons/actuators) to the motherboard of the computer. The control board it self is assembled from a touch pad overlay 15 and a printing overlay 16. The touch pad overlay 15 has sensing means for connected to actuators on the printing overlay 16 and the sensing means is connect to the operation software which then delivers signals to the screen through the connecting portion 14 and the motherboard of the computer.

EXAMPLE 1

Multimedia Computer for Kids

The computer disclosed below is designed for children, where the software to be run on the computer is stored in the control board. The control board also comprises actuators for using the software and operation keys can be inserted into the sockets to allow communication with internet or printer etc.

Description of the Main Parts of the Computer:
a portable case with a simple interface and connectivity, further comprising
an LCD screen, and
AC/DC outlet
a motherboard (with no moving parts so the computer is very quiet)
connection sockets for object keys and control board
a special distribution of Linux operating system
The computer is designed for silence operation, simplicity, security, lightweight, endurability, drop, extreme low power consumption and vibration safety.
Power Applications and Operation
To start the computer it should be connected to electricity, through:
a Wall Power Outlet via the power supply,
a Car Connector (12 volt), or
a Battery pack.
When the user places the control board into the docking portion, the application, starts running automatically. If the selected application needs a particular peripheral device, a key is put into corresponding socket and it is automatically connected. Therefore, a key enabling a printing function or connection to a printer has a corresponding socket, which only receives the printing key.

The computer of this embodiment is specially designed for children from 3 to 12 or disabled persons. The computer does not assume the end users literacy and therefore enables them to enjoy it independently, wherever they are, at home, in school, in the car etc. Special Internet connection is available for the older age of children and it is through a Secured Internet Center for preventing that young children are guided onto internet sites containing harmful content.

Connection Components
 Control Board
 The software is stored inside the control board. In order to run a desired software program the control board carrying the software is placed into the docking portion of the computer and they run automatically. The control board has a shape which has a form representing the shape of the docking portion.
 Operation Keys
 The operation keys fit exactly into the sockets of the computer. Each key is specific for a specific function and only fits one of the plurality of sockets on the computer. Example of components that are plugged into the connectors:
Video-camera,
printer, scanner,
photo camera,
media-memory,
speakers,
drawing tablet, and
Internet wireless connection, etc.
 Accessories
 Accessories or peripheral devices for the computer:
computer storage/travelling case
battery outlet
camera
mouse
printer
scanner
cubes connection pad. etc.

This list of possible accessories and pheripheral devices is not limiting and is intended to give examples of devices associated to computers at each time.
 Special Software Packages
 Possible software packages for such a computer are, but not limited to:
 Music Audio studio
 Photo and image studio
 Video media programs
 Movie making
 Education programs
 One specific product is a computer for kids with the trademark BRAINQ. The following product description is specific for this product and is not intended to be limiting for the present invention, but to give an example of a working device.
 Specification

| Product Name | BRAINQ |
|---|---|
| Display | 7-inch 16:9 colour LCD. 480 × 234 pixels |
| Flash Storage | 128 MB NAND flash |
| Memory | 256 MB DDR |
| Audio Codec | AC'97 |
| USB controller | AMD Geode LX |
| I/O connection | USB 2.0 * 6 |
| AC Adapter | 12 V, 2 A |
| Operating temperature | 0° to 40° C. |
| Storage temperature | −20° to 60° C. |
| Operating humidity | 5 to 95% RH |
| Dimensions (mm) | 202[W] × 163[L] × 44[H] |
| Processor | AMD Geode LX-700 |
| Chipset | AMD CS5536 |
| Operating System | Distributed version of Linux |
| Audio | Integrated stereo speakers |
| Networking | WLAN |
| Power supply | AC-adapter |
| Application | Education, entertainment, communication |

Definitions:
BrainQ: The device itself.
QDOCK: The receptacle/docking portion of the BrainQ, which QPADs are inserted into.
QPAD: The control board inserted into the QDOCK comprising the application and optionally a device built into the top surface.
QKEY: The operation key inserted into one of the slots (QPORT), required by the QPAD for operation of the application it provides.
QPORT: The socket in the BrainQ which a QKEY is inserted into.
 Hardware Components
 CPU: AMD Geode LX with AMD Geode CS5536 companion device
 RAM: 256 MB DDR 333
 Graphics: AMD Geode LX
 Sound: AMD Geode CS5536 (Realtek AC97)
 Display: InnoLux 7" analog TFT LCD
 Resolution: See below.
 Software
 Linux Operating System (Busybox).
 ash shell.
 FlashPlayer (version 9)
 baselayout-lite
 busybox
 glibc
 cppunit
 boost
 e2fsprogs
 autofs
 alsa-headers
 alsa-lib
 alsa-utils
 xorg-server
 xf86-video-nsc
 xli
 xterm
 xf86-input-evdev
 xrdb
 libXcursor
 xscreensaver
 libsdl
 svgalib
 mplayer
 glib
 Application-Framework
 The interface you see presented by the BrainQ when it has started up is the application framework. This framework is what handles the launching of an application from a QPAD which is inserted, and manages the use of required or optional QKEYS with the application.

The events described below illustrate the behaviour which the application framework provides.

Computer Turned On

When the BrainQ is turned on, it will boot up and then display the desktop waiting for a QPAD to be inserted. If a QPAD is already inserted when the application framework has been loaded, then it will be detected and handled as if it was just inserted.

Application Suspended

There is a strict rule that an application can only be running when the devices it requires are inserted. If a required device is removed while an inserted QPAD's application is running, then the application is suspended until the device is either replaced or the QPAD is removed.

Application Resumed

When a suspended application has all of its required devices inserted again, it will be resumed by the framework.

QPAD Inserted

The framework first looks for a devices file. This determines which QKEYs are required in order for the application to be launched and used. Each QKEY which is not already present has a visual indication of its necessity displayed to the user. When all the required QKEYs have been inserted, then the application on the QPAD is launched. This process involved in this is described in detail in the Application Development/Application Framework section.

QPAD Ejected

The framework will clean up in order to prepare for the next QPAD which is inserted. This will result in the running application being killed and any unsaved data will be lost.

QKEY Inserted

If a QPAD is waiting for the insertion of required devices the BrainQ will be in one of two possible-states. It will either be waiting to locate and launch the application from an inserted QPAD or it will be waiting to resume a suspended application.

If a QPAD is waiting for the insertion of devices required before its application can be located and launched, then the QKEY is taken into account in this process. If it is not a required device and is not specifically allowed as an optional device, then it must be removed before the process can proceed. If it is a required device, then it may result in this process being able to proceed.

If the application on the QPAD has been launched, then depending on whether the device is a required one, there are two different responses. If the device is not required, then the application is suspended. If the application is already suspended, then the addition of any last outstanding specified device will allow it to resume. Optional devices will not affect the suspension state of the application.

QKEY Removed

Removal of required QKEYs while an application is running will result in the suspension of the application.

User Inactivity

If the user has not operated the device within the last five minutes the screensaver will be displayed, and if there is no further activity for a further five minutes the screen will be turned off.

The screensaver is however disabled by the application framework while video applications are running.

Computer Turned Off

With power no longer available, the BrainQ will effectively be switched off and any running application will have lost its unsaved data.

Application Development

Your application will eventually be packaged on a QPAD. But during the development process, it is convenient to put it on a USB key and to test it from there. In order to do this, you need to know how to prepare the USB key in a way compatible with The application framework. This directly replicates how the application and it's data will be stored on a QPAD, but in a way which allows direct testing during the development process.

QKEYs can also provide storage. If they do, it should be prepared in the same manner. However while The application framework makes any storage the QKEYs provide available to your application, it does not use it in any way. As your application would require the user to obtain and insert the QKEY devices which provide this storage, the storage would be there for it to make use of directly.

Application Types

Having chosen a representative file, its application type is determined. After which handling for that type of application is launched. The application type is determined through the following steps in the given order:

Playlist: The "playlist" filename prefix.
Flash: The flash filename extension ".swf".
Playlist: The ".m3u" or ".asx" filename extensions.
Video: The video filename extensions (wmv, asf, avi, divx, xvid, mpg, mpeg, mp4, m1v, m2v, m4v, rm, ram, vob, ifo, mov, qt).
Sound: The sound filename extensions (mp3, mp2, ogg, wma, mid, way, voc).
Picture: The picture filename extensions (jpeg, jpg, jpe, jp2, png, tif, tiff, bmp, tga, svg, psd).
Executable: The executable flag.

Application Launching

Depending on the application type which was chosen, the file itself may not be directly used. How the file is used depending on the application type is detailed below.

Playlist

The chosen file is launched in mplayer as a playlist and told to loop when all the entries have been viewed. If the playlist is not in the standard M3U or ASX formats (as the filename extension should indicate they will be), then it is expected to have the name of each file to play in order, each filename on a different line.

Flash

The chosen file is run within Adobe Flashplayer.

Video

If the chosen file has the "autorun" filename prefix, then it is run in mplayer directly. Otherwise a playlist is automatically created for all files in the root directory of the QPAD which have recognizable video filename extensions, in alphabetical order, and this playlist is run in mplayer.

Sound

If the chosen file has the "autorun" filename prefix, then it is run in mplayer directly. Otherwise a playlist is automatically created for all files in the root directory of the QPAD which have recognizable sound filename extensions, in alphabetical order, and this playlist is run in mplayer.

Picture

If the chosen file has the "autorun" filename prefix, then it is run in mplayer directly. Otherwise a playlist is automatically created for all files in the root directory of the QPAD which have recognizable picture filename extensions, in alphabetical order, and this playlist is run in mplayer.

Executable

The chosen file is run.

The invention claimed is:

1. A display device for performing multimedia functions, the display device comprising:
   a housing;
   a motherboard;

a screen;

a video controller;

a plurality of sockets with each socket having a different shape from the other sockets to receive an activation member, the sockets being located on a face of housing; and a docking portion being located proximate to the plurality of sockets, wherein the docking portion receives a control board further comprising the operational software and human-machine-interface for operation of the display device and the multimedia functions and wherein the activation members activate functions of the display device or connect the display device to peripheral devices.

2. The display device according to claim 1, wherein the activation members are readily insertable into and removable from the sockets, the activation members are for activating functions of the display device.

3. The display device according to claim 1, wherein one or more of the plurality of sockets receive a memory device with multimedia content to by played by the display device.

4. The display device according to claim 1, wherein one or more of the plurality of sockets receive a memory device to copy data from the display device to transport to other multimedia devices.

5. The display device according to claim 1, wherein one or more of the plurality of sockets receive activation members for activating internet access.

6. The display device according to claim 1, wherein one or more of the plurality of sockets receive activation members for activating accessory devices.

7. The display device according to claim 1, wherein the display device further comprises a secondary storage means.

8. The display device according to claim 1, wherein the display device is a computer and the control board includes controllers, software and memory.

9. The display device according to claim 1, wherein the display device further comprises a disk drive.

10. A multimedia display system for performing multimedia operation comprising:

a display device comprising:
  a housing;
  a screen;
  a motherboard;
  a video controller;
  a plurality of sockets on a face of the housing; and
  a docking portion proximate to the plurality of sockets, the docking portion occupying a majority of the face of the housing, a control board readily inserted into the docking portion; and activation members to be inserted into the one or more sockets, the activation members being readily insertable into one of the plurality of sockets, wherein the control board further comprises the operational software for the device and the human-machine-interface for performing the multimedia function, and the activation members activate functions of the display device or connect the display device to peripheral devices.

11. The display device according to claim 10, wherein one or more of the plurality of sockets receive activation members for activating functions of the display device.

12. The display device according to claim 10, wherein one or more of the plurality of sockets receive a memory device with multimedia content to by played by the display device.

13. The display device according to claim 10, wherein one or more of the plurality of sockets receive a memory device to copy data from the display device to transport to other multimedia devices.

14. The display device according to claim 10, wherein one or more of the plurality of sockets receive activation members for activating interne access.

15. The display device according to claim 10, wherein one or more of the plurality of sockets receive activation members for activating accessory devices.

16. The display device according to claim 10, wherein the display device further comprises a secondary storage means.

17. The display device according to claim 10, wherein the display device is a computer and the control board includes controllers, software and memory.

18. The display device according to claim 10, wherein the plurality of sockets each have a different shape from the other sockets and wherein the activation members are insertable into a respective socket which matches a shape of an end of the activation member, the sockets being located on a face of the housing proximate to the docking portion.

* * * * *